United States Patent Office 2,860,647
Patented Nov. 18, 1958

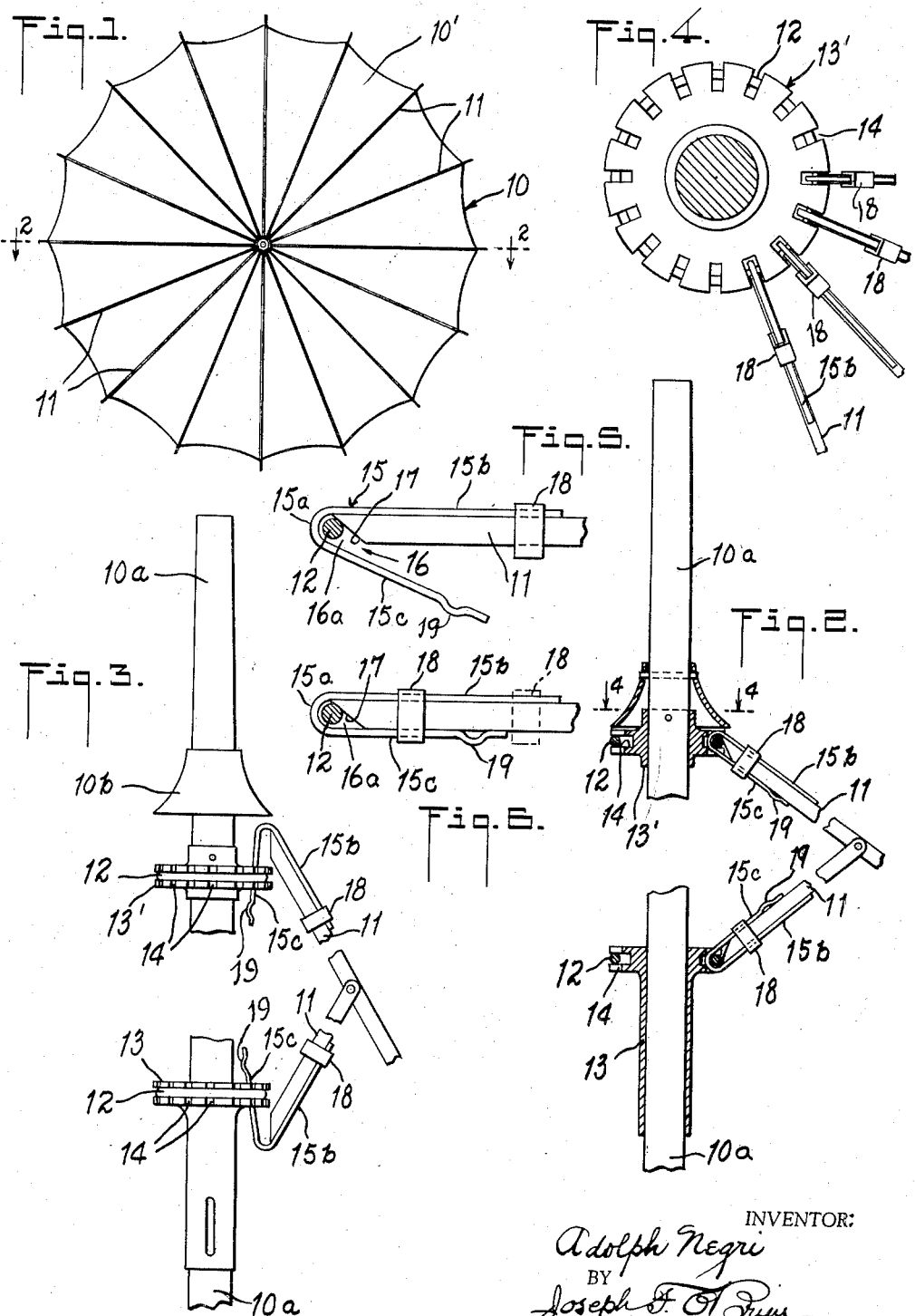

2,860,647

UMBRELLA AND A REPLACEABLE RIB THEREFOR

Adolph Negri, Brooklyn, N. Y.

Application September 10, 1956, Serial No. 608,765

1 Claim. (Cl. 135—29)

This invention relates to improvements in umbrellas and replaceable ribs therefor.

In the standard umbrella, the ribs are provided with pivot holes of fixed size and pivoted on removable pivot wires located in grommets. Thus, a piece or strip of wire is threaded through fixed holes or pivot sockets in the pivoted part of the rib and across kerfs in the grommet, and when it is desired to replace or repair a rib this pivot wire is loosened and pulled out of all the pivot holes or sockets of the ribs so that they are all released simultaneously. One of the ribs may thereupon be removed, repaired and replaced and then all of the ribs again assembled in the grommet and pivotally mounted by passing the pivot wire again through the said pivot holes of fixed size in the rib when so assembled in the grommet.

One of the objects of this invention is to provide an improved umbrella construction in which each of the ribs is independently removable and independently pivotally mountable in the grommet and thus to provide a construction in which the ribs will be readily, easily and quickly removable and thereafter remounted and held securely in place in the umbrella.

In accordance with this invention, the removable pivot wire above referred to is replaced by a fixed pivot ring positioned stationarily in the kerfed grommet and each of the ribs is independently provided with means for producing an openable and closable pivot socket for independent pivotal mounting and demounting of each rib on the fixed wire ring when used, as aforesaid, in connection with the kerfed grommet to enable positioning and guiding of the ribs during the operative movement thereof.

Another object of my invention is to provide in an umbrella a fixed metallic pivot ring mounted in a grommet or pivot plate provided with radiating kerfs combined with releasable pivot-mounting means on each of the ribs, whereby I provide for independent pivotal mounting and demounting on the fixed ring of each rib and thus produce a readily mountable and demountable rib, and an important feature of my invention is to improve the pivotal mounting or fastening means on the umbrella including the grommet and pivot ring and also the pivotal mounting means on the ribs for secure pivotal mounting of the ribs on the pivot ring and grommet.

Another object of my invention is to provide on each rib a pivotal mounting means having a socket-opening element that is capable of being quickly mounted on the pivot ring of the grommet and immediately locked to the body of the rib and thus to cause the pivotal mounting to be securely held against an unintentional releasing movement, and with this end in view I provide a novel releasable socket-forming element adapted to be securely locked by movable locking elements to the rib body to provide a completely enclosed socket and which will automatically open up on release of the locking means to produce an open channel to the mounting socket and thus to permit a secure though releasable engagement of the pivot socket with the fixed pivot ring on the mounting grommet, whereby each rib will be independently pivotally mounted in such manner that the rib may be moved and operated in the normal way for a long period of time without any possibility of accidental or unintentional release.

Another object of this invention is to improve the pivotal socket per se and utilize a shape of mounting-socket wall that will form on the end of the rib a track along which the pivot can move for the purpose of guiding the rib in a true movement about its pivot ring section, and to this end I provide at the terminal end of the rib which forms a part of the pivot socket a bevelled edge which forms a pivot-track in the rib socket to assist in guiding the pivotal movement of the rib.

Another object of this invention is to provide a releasable socket-forming element adapted to swing open automatically to permit access to the socket upon release of the locking means. Said socket-forming element comprises an elongated U-shaped member which has a socket-forming portion and two end unit parts, one of which is stationarily fastened to the rib to cause the U-shaped junction portion of the member to provide a socket wall and the other end part is a freely movable spring-actuated tongue or arm which opens up to provide access to said socket-forming portion. Said spring arm or tongue is insertable through a kerf in the grommet or pivot plate and passed over a fixed pivot-ring section. Said arm or tongue is then manually moved to closed position against the body of the rib and is securely locked by the provision of a slidable locking collar which is seated on and movable along the rib body in such a manner as to lock said spring tongue to said rib body and thus to close the socket around the pivot pin.

Another object of this invention is in a socket-opening and closing device of the character specified to utilize in combination with a spring-actuated socket-opening tongue and a locking collar of the type specified, a locking hump on said tongue adapted to permit movement of the collar along said tongue and across said hump, and thus to securely lock the locking collars against an unintentional or accidental unlocking movement, and in accordance with the preferred form of my invention, I employ a U-shaped socket-forming element for pivotal engagement with the fixed ring in combination with a slidable locking collar that is movable along a rib body and into engagement with a spring tongue or mounting arm of the U-shaped socket forming element to provide a complete closing of the socket by the socket-forming member and in such closing movement said collar passes over a locking hump on said movable mounting arm or tongue to prevent accidental return of said collar and provide a secure locking of the tongue to the rib, and in the case of umbrellas which are provided with ribs that are assembled to move in close association with each other, the sliding locking collars on the rib and tongue are arranged in staggered relationship to each other so as to permit such close assembly of the ribs without interference.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:

Fig. 1 is a view in plan of the inside of an umbrella in open position;

Fig. 2 is a section on the line 2—2 of Fig. 1, looking in the direction of the arrows and showing fragmentary portions of replaceable ribs having socket-forming mounting elements in locked position;

Fig. 3 is a view similar to Fig. 2 showing a rib having the socket-forming mounting elements in released position prior to complete demounting of a rib;

Fig. 4 is a section on the line 4—4 of Fig. 2, looking in the direction of the arrows and showing the ribs mounted on the pivot ring in the grommet and the socket-forming mounting elements in locked position;

Fig. 5 is a fragmentary view of the end of a rib having one of the socket-forming mounting elements attached thereto with one of the arms of the socket-forming element in open socket-access position; and Fig. 6 is a view similar to Fig. 5 showing the socket-opening arm of the socket-forming element in closed and locked position on the rib end.

Referring now to these drawings which illustrate a preferred embodiment of my invention, 10 indicates an umbrella embodying a conventionl stick 10$^a$ and cover 10′ connected by a conventional locking disc 10$^b$ and supported by a series of ribs 11 which, in accordance with my instant invention, are mounted so as to be independently or separately removable and replaceable, as for example when a rib becomes bent or broken. Thus, each of the ribs in accordance with my invention is independently pivotally mounted on rings 12 in conventional slidable and stationary grommets 13—13′. These ribs are so mounted as to enable them to be movable freely into open and closed positions and also enable each rib to be quickly and independently removable so that a new rib may be immediately and quickly demounted and remounted and held securely in place in the umbrella.

In the standard umbrella, the rib ends are usually provided with pivot holes and these perforated rib ends are pivoted to the grommet by removable pivot wires located in the grommets. In this method, in order to hold a rib in pivotal relationship to the grommet, a piece or strip of wire is threaded through fixed pivot holes or pivot sockets in the pivotal part of the ribs while the rib is positioned in the grommet. This wire is threaded across the kerfs of the grommet and when it is necessary to replace or repair a rib this pivot wire must be loosened, and this loosens all the ribs so that they will all become released simultaneously. The ribs may then again be pivotally mounted by threading the pivot wire again through the pivot holes in the end of the rib after the same are properly assembled in the grommet.

In the present invention each of the ribs is, as aforesaid, independently demountable and replaceable and with this end in view the removable pivot wire of the standard umbrella above referred to is replaced by the fixed pivot ring 12 which is positioned stationarily in the standard kerfed grommet 13 having the kerfs 14, and each of the ribs is independently provided with means for producing an openable and closable socket-forming element 15 for engagement with the pivot ring 12 that will enable independent pivotal mounting and demounting of each of the ribs 11 on said fixed pivot ring 12 when mounted, as aforesaid, in connection with the kerfed grommet and thus when so engaged to enable positioning and guiding during opening and closing movements thereof of ribs having such openable and closable socket-forming elements.

In my present invention, the grommet or pivot plate 13 is provided with the usual radiating kerfs 14 and the fixed ring 12 is mounted in the grommet in standard position and extends across kerfs 14, but I greatly improve the pivotal mounting means for mounting the rib ends on the pivot ring and in the grommets. It is desirable in a replaceable rib construction to have on each rib a mounting means embodying a socket opening and closing member that is capable of being quickly removed and quickly applied to and mounted on the pivot ring in the grommet and thereafter immediately locked by manual operation to the body of the rib so as to cause the pivotal mounting to be securely held against an unintentional releasing movement.

In the preferred embodiment of my invention, I provide a novel releasable and lockable socket-forming element 15 having a U-shaped socket-forming portion 15$^a$ which is adapted to be securely locked to the rib to provide a completely enclosed socket and which preferably will be provided with means adapted to automatically open up on release of the locking means to provide an openable and closable channel 16 to the mounting socket in the mounting member 15. Such openable and closable channel will permit a secure though releasable engagement of the pivot socket member 15 with the fixed pivot ring 12 on the mounting grommet 13, and will enable each rib to be independently pivotally mounted in such manner that the rib may be moved and operated in the normal way for a long period of time without any possibility of accidental or unintentional release.

In the preferred form of my invention, I apply the member 15 to the end of the rib and form on the end of the rib per se a pivot-track along which the rib can readily move over the pivot ring section to which it is pivoted. This pivot track will thus guide such rib in a true movement about its pivot ring section, and for this purpose the terminal end of each rib which is adjacent to the pivot socket is extended into the socket and provided with a bevelled edge 17. This bevelled end thus forms a pivot track in the pivot-socket and when the rib is mounted in the pivot socket will assist in guiding the pivot movement of the rib.

By my invention, the releasable socket element 15 is provided with a U-shaped socket-forming portion 15$^a$ which surrounds and encloses the bevelled track portion 17 of the rib 11 and cooperates therewith to form the pivot socket. Said element embodies a pair of end unit parts 15$^b$ and 15$^c$, respectively, one of which, viz., the part 15$^b$, is stationarily fastened to the end of the rib to cause the U-shaped portion 15$^a$ to surround said bevelled end 17 and provide, as aforesaid, a portion of the socket wall and the other end part 15$^c$ comprises a freely-movable spring-actuated arm or tongue, which as shown in Figs. 3 and 5 opens up to provide the pivot access channel 16 which is closable and lockable by other parts of the socket-forming element 15.

In replacing a rib, said spring arm or tongue 15$^c$ is insertable through a kerf in the grommet or pivot plate 13 and passed over a section of the fixed pivot ring 12. Said arm 15$^c$ is then manually moved into closed position against the body of the rib as shown in Figs. 2 and 6 and is securely locked in such position by the provision of a slidable locking collar 18 which is seated on the rib body 11 and is movable along said rib body and over said spring member 15$^c$ to close the pivot socket 16$^a$ around the pivot pin 12.

In the form of my invention shown, the spring-actuated socket opening arm 15$^c$ is provided with a locking hump 19 having smoothed end portions adapted to permit movement of the collar along said tongue and across said hump 19. Said hump 19 will when the collar is thus moved across the same prevent backward or rearward movement of the collar and will thus securely lock the arm 15$^c$ against the rib. The locking collar will thus be held against a releasing movement and an unintentional or accidental unlocking movement will be avoided. The locking collar 18 is preferably fitted tightly on the rib and opening arm 15$^c$ and is movable from the position shown in full lines in Fig. 5 and in dotted lines in Fig. 6 toward the U-shaped portion 15$^a$ and across the hump 19. I am thus enabled to provide a complete closing and locking of the socket-forming member and in such closing movement said collar is additionally held in position by the spring member 15$^c$, but is particularly locked against opening movement because the hump 19 will prevent any releasing movement of the said collar 18 rearwardly or backwardly, as aforesaid, into unlocked position except by actual manual movement thereof.

In the preferred embodiment of my invention also a series of these locking collars 18 are preferably, as shown more particularly in Fig. 4, arranged on the ribs locked thereby in staggered relationship to each other. This will permit close assembly of such ribs in relation to each other and prevent any interference of the locking collar with the movement of the rib.

Having described my invention, I claim:

An umbrella having replaceable ribs embodying, in combination, a grommet having a fixed pivot ring, a replaceable umbrella rib pivotally mountable upon said pivot ring and having fastened thereto at its terminal end a resilient openable and closable socket-forming element composed of a pair of arms formed of spring material and in open position disposed in V-shaped relationship to each other, said socket-forming element comprising a mounting arm fixedly fastened at one side of and in parallel relationship to the rib body, an intermediate U-shaped socket portion at the terminal end of the rib body to provide in said element a pivot socket portion, and an elongated spring guide-arm having an integral connection with said intermediate U-shaped socket portion and in open position extending in inclined relationship to the opposite side of said rib, said guide-arm being adapted automatically to spring open into said inclined relationship to said rib body to provide a V-shaped access channel to the socket portion between its end portion and the end portion of the rib body, said spring guide-arm being resiliently-movable into engagement with said opposite side of the rib body to close said access channel, said end portion of said guide-arm being movable through the fixed pivot ring to guide the terminal end of the replaceable rib into connection therewith, said rib being provided adjacent to the socket-forming portion of said guide-arm with a bevelled end to form one side of the end of the V-shaped channel and to assist in guiding said rib and guide-arm members over and into operative engagement with the fixed pivot ring, means for locking said guide-arm in contact with the surface of the rib body to close the V-shaped access channel to the socket portion after engagement thereof with the pivot ring and to securely lock the said spring guide-arm against said rib and produce a closed pivot-socket for mounting of a replaceable rib upon a fixed pivot ring in the grommet.

References Cited in the file of this patent

UNITED STATES PATENTS

| 159,624 | Winter | Feb. 9, 1875 |
| 1,001,076 | Redford | Aug. 22, 1911 |
| 1,107,415 | Drohan | Aug. 18, 1914 |

FOREIGN PATENTS

| 410 | Great Britain | July 30, 1875 |